United States Patent
Lindgren et al.

(10) Patent No.: US 9,591,129 B2
(45) Date of Patent: Mar. 7, 2017

(54) METHOD OF REDUCING SIZE OF PRESENCE MESSAGES

(75) Inventors: Anders Lindgren, Älvsjö (SE); Christer Boberg, Tungelsta (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1730 days.

(21) Appl. No.: 12/746,246

(22) PCT Filed: Dec. 4, 2007

(86) PCT No.: PCT/SE2007/050936
§ 371 (c)(1),
(2), (4) Date: Jun. 4, 2010

(87) PCT Pub. No.: WO2009/072942
PCT Pub. Date: Jun. 11, 2009

(65) Prior Publication Data
US 2010/0274844 A1 Oct. 28, 2010

(51) Int. Cl.
*G06F 15/16* (2006.01)
*H04M 3/42* (2006.01)
(Continued)

(52) U.S. Cl.
CPC .... *H04M 3/42365* (2013.01); *H04L 65/1006* (2013.01); *H04L 67/24* (2013.01); *H04M 7/006* (2013.01); *H04M 7/0093* (2013.01)

(58) Field of Classification Search
CPC ............ H04M 3/42365; H04M 7/006; H04M 7/0093; H04L 65/1006; H04L 67/24
See application file for complete search history.

(56) References Cited

U.S. PATENT DOCUMENTS 7,412,541 B1 *  8/2008  Stadler .................... H04L 69/04
                                                            379/900
8,121,990 B1 *  2/2012  Chapweske ....... G06F 17/30174
                                                            707/695
(Continued)

FOREIGN PATENT DOCUMENTS

NL            7412541 A  *  4/1975  .......... C07D 333/24
WO     WO 2007/116258     10/2007

OTHER PUBLICATIONS

Niemi A et al., Session Initiation Protocol (SIP) Extension for Event State Publication, rfc3903, U. S. A., Internet Engineering Task Force, Oct. 1, 2004, IETF Standard.

*Primary Examiner* — Suraj Joshi
*Assistant Examiner* — Jaren M Means
(74) *Attorney, Agent, or Firm* — Patent Portfolio Builders, PLLC

(57) ABSTRACT

A method in a communication network of delivering messages associated with an information exchange service. A message, to be delivered between two entities is interrogated to determining if the data content has already been delivered to the terminating entity. If the data content has not already been delivered to the second entity, the message is transmitted to the second entity unchanged, while the message is modified, so that the modified message comprises a data identifier, identifying the data content, but no data content. The modified message is then transmitted to the terminating entity, and the data identifier is cached together with the associated data content when a successful transmission of the message has been verified. The suggested versioning mechanism enables transmission of messages with a reduced size.

33 Claims, 4 Drawing Sheets

(51) Int. Cl.
*H04L 29/06* (2006.01)
*H04L 29/08* (2006.01)
*H04M 7/00* (2006.01)

(56) References Cited

U.S. PATENT DOCUMENTS

| | | | |
|---|---|---|---|
| 2003/0120813 A1* | 6/2003 | Majumdar | H04L 29/06 709/247 |
| 2006/0195660 A1* | 8/2006 | Sundarrajan | H04L 69/329 711/118 |
| 2007/0239866 A1* | 10/2007 | Cox | H04L 67/24 709/224 |
| 2009/0013078 A1* | 1/2009 | Bencheikh | H04L 65/1036 709/227 |
| 2009/0019158 A1* | 1/2009 | Langen | H04L 67/1095 709/226 |

* cited by examiner

METHOD OF REDUCING SIZE OF PRESENCE MESSAGES

TECHNICAL FIELD

The present invention relates generally to a method and arrangement for reducing the size of messages, such as e.g. SIP messages, communicated between a client and a server, or vice versa.

BACKGROUND

IP Multimedia Subsystem (IMS) is a technology defined by the Third Generation Partnership Project (3GPP) to provide IP Multimedia services over mobile communication networks. The IMS makes use of the Session Initiation Protocol (SIP) to set up and to control calls or sessions between user entities or between a user entity or a client and a server. Whilst SIP was created as a user-to-user protocol, IMS allows operators and service providers to control user access to services and to charge users accordingly. The 3GPP architecture defines different types of Call Session Control Functions (CSCFs), providing services to different user entities in an IMS.

There are a number of situations where an IMS client A may want to maintain updated information about another IMS client B, which have given client A access permission to do so. The Presences Service based on the IETF SIMPLE (SIP Instant Messaging and Presence Leveraging Extensions) technology is a particular application built on top of the SIP event notification framework. This type of service allows a user to be informed about the reachability, availability, and willingness of communication of another user. The presence service may be used to indicate whether different users are online or not and whether online users are idle or busy. The presence service may also give details of communication means and the respective capabilities of each communication means. A person who is providing presence information is typically called a presences entity, or presentity. A given presentity may have one or more entities operating as clients, typically also referred to as Presence User Agents (PUAs), which can supply updated presence information, i.e. a set of attributes that characterize the properties of the presentity, such as e.g. status, capabilities and/or communication address to a server, providing the presence service to subscribing users.

FIG. 1 schematically shows an exemplified scenario of a SIP presence architecture adapted to provide a presence service according to the prior art. In an IMS network 100, three clients 101-103, which may be any of e.g. an IMS terminal, a laptop, and/or a desktop computer, each have a piece of information about a presentity 104 stored locally. Different clients may hold different or identical information about the presentity 104. An IMS terminal may e.g. hold information about the registration status of the presentity 104, while a laptop may hold information as to if the presentity 104 is logged on or not. In addition, a client may hold richer presence information, such as e.g. whether the presentity is available for videoconferences and/or wants to receive a voice call at present. All presentity clients 101-103 send their respective pieces of information to a presences server 105, which gathers all information and obtains a complete picture of the presentity's 104 presence. FIG. 1 also shows two users 106,107, typically referred to as watchers, each equipped with a respective entity 108, 109, wherein each entity is operating as a respective watcher client, via which the respective user 106,107 may subscribe to presence information of a specific presentity or a number of presentities, specified in a list, i.e. a presentities presence list. The presence server 105 notifies all the subscribing watchers when a change has occurred in the respective presentity's presence information, i.e. when a presentity has delivered new presence information to the presence server 105 via a SIP PUBLISH request, by delivering the published information to the respective one or more watchers in a SIP NOTIFY request.

In current SIMPLE based solutions it is necessary for the presence server to send a new notification, comprising all data or parts of the data, i.e. partial notify, whenever a change occurs in the presence data. Such a notification must be sent no matter if the presence data has already been delivered to a respective watcher in a previous notification or not.

Since many of the notifications sent from the presence server to a watcher are just toggling of one data, such as "open" or "closed" for a service, a lot of data which has already been delivered between the two entities is sent over the air-interface. Even in the case of partial notifications, the size is not without significance.

In addition, repeated transmissions of identical data content requires more complicated functionality, rendering a costly processing, both at the server, creating a notification, and at the watcher, having to process each received notification and to create a final result on the basis of the processed content.

SUMMARY

The object of the present invention is to address at least some of the problems outlined above. In particular it is an object of the present invention to provide a solution that can generally reduce the size of some messages transmitted in a communication network between a client and a server, or vice versa.

These objects, along with others, may be obtained by using a method and entities according to the attached independent claims.

According to one aspect, the present invention provides a method in a communication network of delivering messages associated with an information exchange service between a first entity and a second entity. Initially a message, associated with an information exchange service, comprising data content and a request for versioning is processed at the first entity. Versioning is defined as a selectable mechanism, adapted to associate each version of data content of a message with a data identifier, identifying the respective version. The first entity then interrogates the received message, to determine if the data content has already been delivered to the second entity in an earlier transmission. If it is determined that the data content has not already been delivered to the second entity, the message will remain unchanged when transmitted to the second entity. If, however, it is found that the data content has already been delivered to the second entity, a modified message, comprising a data identifier but no data content, is instead transmitted to the second entity.

According to a first embodiment, the first entity is a server and the second entity is a client.

Typically, the first entity receives a request for an information exchange service from the second entity, prior to executing the received message, wherein the request comprises an indication that versioning is required. The message may be a SIP notification, which is transmitted from the client to the server.

According to a second embodiment, the first entity is instead a client and the second entity is a server. In such an embodiment the message may instead be a SIP publication.

The suggested determining step may comprise the step of interrogating a cache of the first entity in order to determine if the respective data content has already been delivered to the second entity.

According to one aspect, the data identifier is inserted into the message at the first entity.

According to another aspect, the data identifier is instead provided from the second entity.

A data identifier provided from the second entity may be provided to the first entity in a response message, the response message indicating a successful delivery of the message.

According to another aspect, the present invention provides a method in a communication network of handling messages associated with an information exchange service at a first entity, wherein messages are delivered from a second entity to the first entity.

Initially, the first entity receives a message associated with the requested information exchange service, wherein the message comprises a request for versioning. At the first entity it is determined if the message, requesting for versioning, comprises data content. If it is found that the message comprises data content, a data identifier, associated with the data content is retrieved by the first entity, and the data content is stored together with the data identifier.

If, however, the message does not comprise any data content, the message will instead be provided with data content associated with a data identifier, wherein the data identifier is retrieved from the message. Once the respective data content has been retrieved, the message may be processed accordingly.

According to a first embodiment, the first entity is a client and the second entity is a server. In such a scenario the message may be a SIP notification.

According to one aspect, a request for an information exchange service, indicating that versioning is required, is forwarded to the second entity, prior to executing the receiving step mentioned above.

According to a second embodiment, the first entity is instead be a server, while the second entity is a client. In such a case the message may instead be a SIP publication.

According to one aspect, the data identifier is retrieved from the first entity, wherein the data identifier may be forwarded from the first entity to the second entity in a response message, the response message indicating that the message has been delivered successfully.

According to yet another aspect, the data identifier may instead be retrieved from the message, the data identifier being inserted into the message at the second entity.

According to another aspect, the data content and the associated data identifier are stored in a cache of the first entity subsequent to receiving a response message, verifying that the message has been successfully delivered to the second entity, and that the data content and the associated data have been stored at another cache of the second entity.

According to one aspect, a first response message comprises an indication of the total capacity of the cache of said second entity.

According to another aspect, each response message may instead comprise an indication of the remaining capacity of the cache of said second entity according to another aspect. The data identifier may be a version number, a unique identity, or an Etag.

According to another aspect, a first entity for delivering messages associated with an information exchange service to a second entity is provided. A processing unit is adapted to process a message, comprising data content and a request for versioning, associated with the requested information exchange service. A versioning unit is adapted to determine whether the data content has already been delivered to the client or not. If it is found that the data content has not already been delivered to the client, the message will be transmitted unchanged to the client from a communication unit. If, however, it is determined that the data content has already been delivered to the second entity, a modified message will instead be transmitted to the client, wherein the modified message will comprise a data identifier but no data content.

According to a first embodiment, the first entity is a server, while the second entity is a client.

According to one aspect, the communication unit may also comprise a receiver for receiving a request for an information exchange service from the second entity, the request indicating that versioning is required.

According to yet another aspect, the versioning unit may be adapted to determine if the data content has already been delivered to the first entity or not, by interrogating a cache.

According to a second embodiment, the first entity is instead a client, while the second entity is a server.

According to another aspect, a first entity of handling messages associated with an information exchange service is provided, wherein messages are received from a second entity. The first entity comprises a communication unit for receiving a message from the second entity, the message comprising a request for versioning. The entity also comprises a versioning unit for determining if the message comprises data content. The versioning unit is adapted to retrieve a data identifier associated with the data content and to cache the data content together with the associated data identifier if the message comprises data content. If, however, the message does not comprise any data content, the versioning unit is adapted to provide the message with stored data content, after having retrieved the associated data identifier from the message. The first entity also comprises a processing unit for processing the message.

According to one embodiment, the first entity is a server and the second entity is a client, According to one aspect, the communication unit of the first entity may also comprise a transmitter for forwarding a request for an information exchange service, indicating that versioning is required, to the second entity.

According to yet another aspect, the versioning unit is connected to a cache, wherein the versioning unit is adapted to cache data content and an associated data identifier in response to a successfully delivered or received message.

According to a second embodiment, the first entity is instead a client, while the second entity is a server.

BRIEF DESCRIPTION OF THE DRAWINGS

The present invention will now be described in more detail by means of exemplary embodiments and with reference to the accompanying drawings, in which.

DETAILED DESCRIPTION

Typically for an IMS service, such as e.g. a presence service, a large amount of data is delivered to entities that has already received identical data content earlier, i.e. in an earlier request, such as a publication or a notification. The scope of this document is to present a mechanism which allows a transmitting entity to avoid transmitting data content, e.g. presence information, from a transmitting entity to a receiving entity, if the same information has already been delivered from the transmitting entity to the receiving entity at a previous stage.

Since many notifications that are sent from a presence server, managing a presence service, are carrying the same presence information as an earlier sent notification, it would heavily reduce the notification size if it would be possible to point out to the presence server what presence information that is presently valid for the presentity. Also for the communication between a presentity and the presence server a corresponding mechanism would be desirable in order to reduce the size of at least some of the publications.

A mechanism addressing the problems mentioned above may be achieved by including a data identifier, carrying e.g. an Etag, version number or a unique identifier, into a SIP message, such as e.g. a notification or a publication. Whenever a new message is to be transmitted to the same server or client and the data content to be forwarded via the SIP message is found to be identical to data content sent in an earlier SIP message after having interrogated a cache at the transmitting end, the new message will only include the data identifier, thereby avoiding to transmit the already delivered data content once again. This means that the transmitting entity will have to keep track of the data content that has been delivered from the entity in earlier messages, as well as the data identifier, associated with the respective data content.

Figure 1:
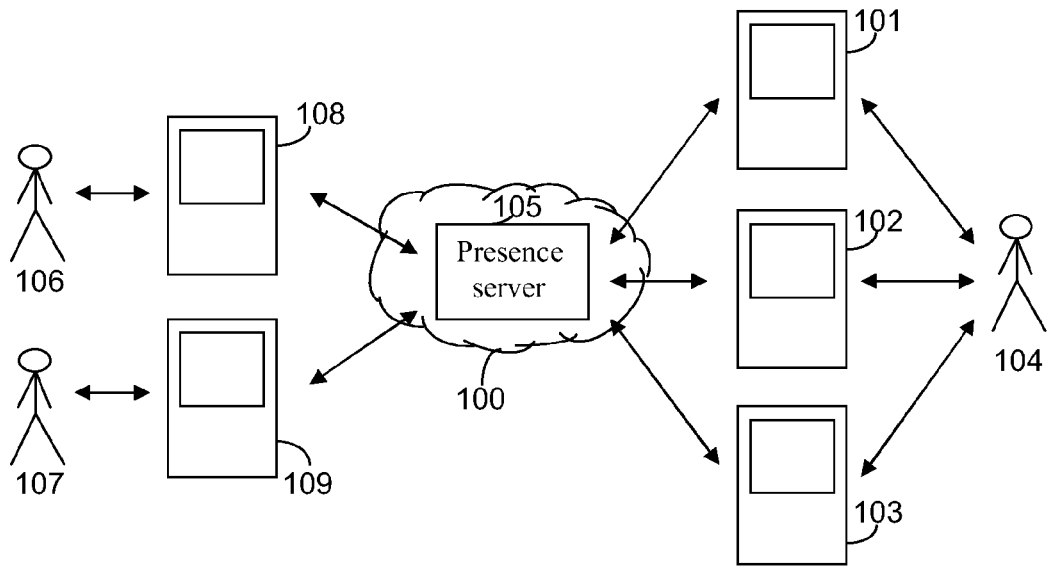
FIG. 1 is a basic overview of a SIP Presence architecture, according to the prior art.
Figure 2:
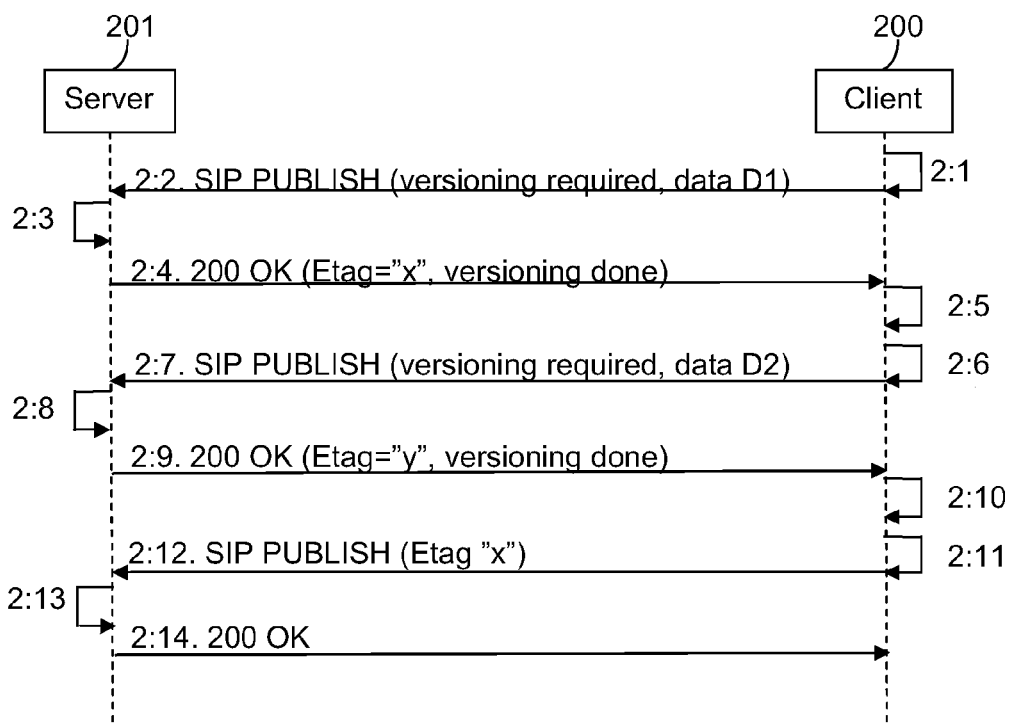
FIG. 2 is a schematic flow diagram of a presence publication between a client and a server, according to one embodiment.
Figure 3:
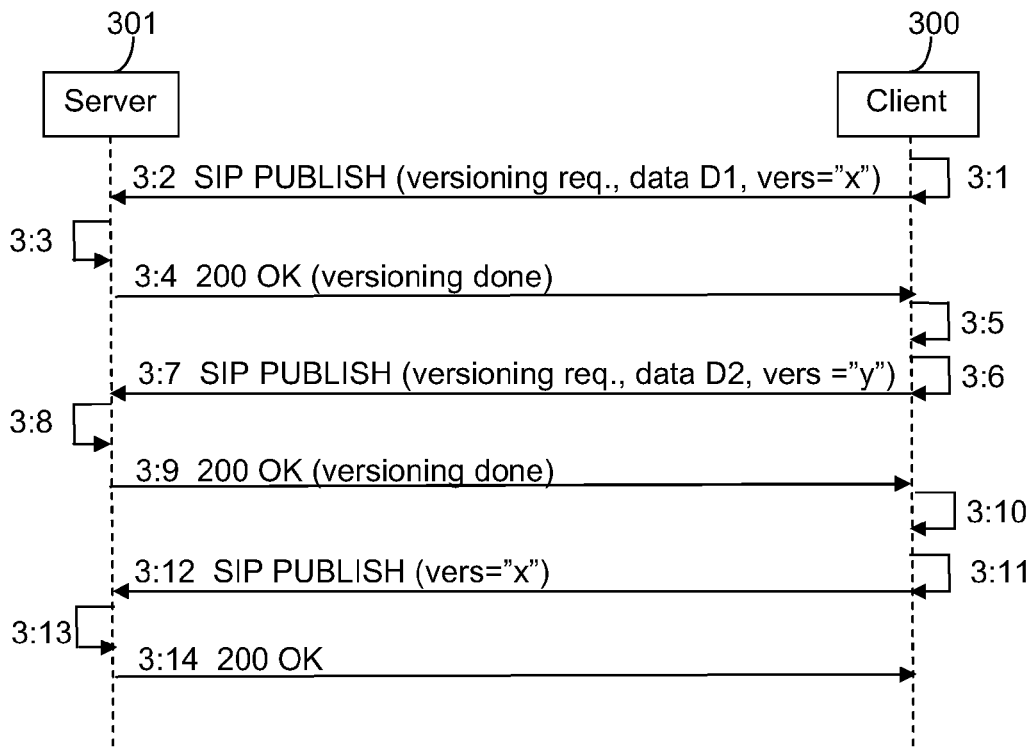
FIG. 3 is a schematic flow diagram of a presence publication between a client and a server, according to another embodiment.
Figure 4:
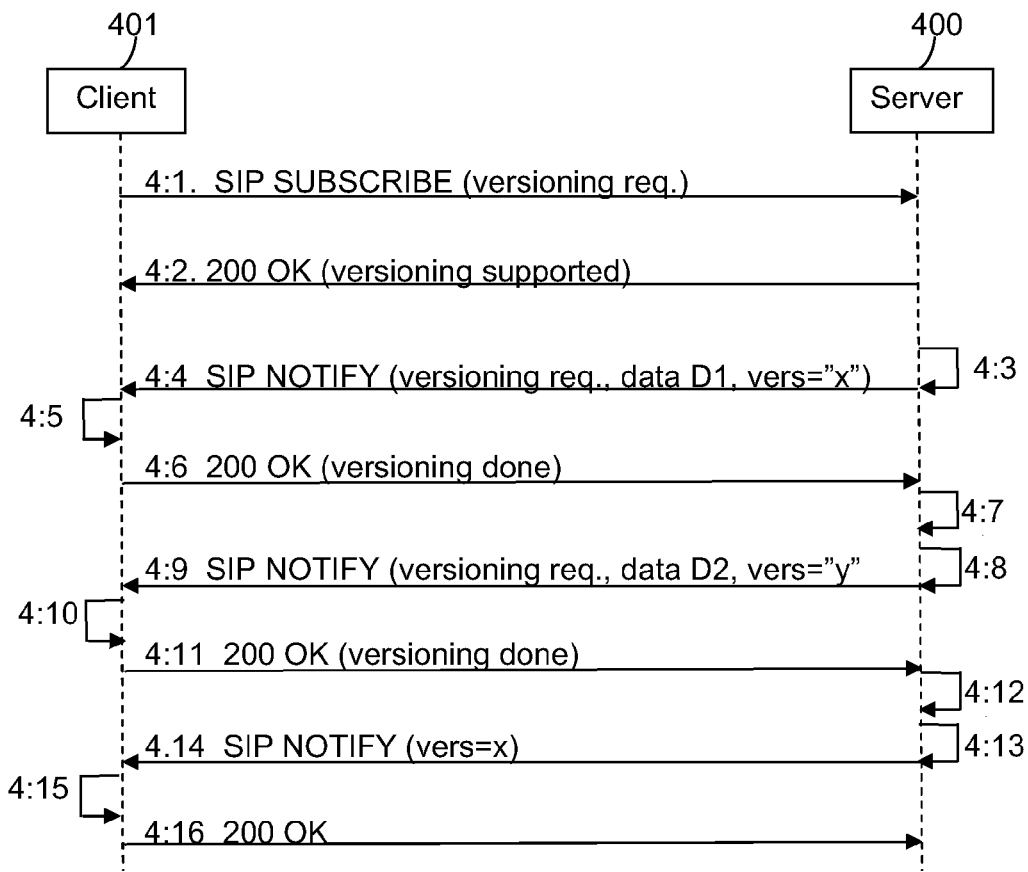
FIG. 4 is a schematic flow diagram of a presence notification between a server and a client, according to one embodiment.

In order to get a more clearly understanding of the suggested versioning mechanism, it will now be exemplified in the context of executing a presence service, as illustrated with reference to FIGS. 2-4. FIGS. 2 and 3 illustrates how versioning may be executed between a client, operating as a presentity, providing updated publications to a server, which in this case is a presentity server, according to two alternative embodiments. FIG. 4, illustrates a way of realising a corresponding versioning mechanism, operable between a server, providing notifications to one or more clients, and a client, operating as a watcher, receiving notifications from the server.

For simplicity reasons, all examples in this document are limited to describing versioning executed between two entities, i.e. between a client and a server, such as, e.g. a presentity and a presence server, or between a presence server and a watcher. It is, however, to be understood that the described versioning mechanism may be applicable also between a number of entities involved in the execution of a service, wherein versioning may be applicable all the way from a presentity, to a presence server and also of a terminating watcher. It is also to be understood that the described versioning mechanism is not limited to handling only delivery of presence service information, but any type of service information delivery. In particular, versioning according to any of the described embodiments will also be applicable in other implementations where it is required to reduce the transmission of redundant data content, or more specifically, the amount of data content that has to be transmitted between interacting entities.

FIG. 2 illustrates an exemplified signalling scenario, relevant for the execution of publishing associated with a presence service, i.e. signalling between a client 200, operating as a presentity, providing publications to a server, and a server 201, operating as a presentity server. The embodiment described with reference to FIG. 2 is one way of providing versioning by using the already existing Etag, i.e. for using the Etag also for the purpose of identifying different versions of transmitted presence information.

A client 200, having relevant presence information, i.e. data content, here identified as D1, to be deliver to a server 201 may enabling versioning if such a mechanism is supported by both entities. Publications are typically delivered between entities as messages, provided as publication requests, i.e. as SIP PUBLISH requests. Publication requests, therefore may comprise a request for versioning, e.g. as "versioning required", in addition to the usual data content D1.

In a first step 2:1, the client 200 processes a publication and interrogates a cache in order to determine if the data content D1 of the publication, delivered as a SIP PUBLISH request has been sent to the server in a previous request. However, since this is the first time data content D1 is to be transmitted to the server 201, no data content which is identical to D1 can be found in the cache. The SIP PUBLISH request is therefore transmitted unchanged to the server in a next step 2:2. In response to the SIP PUBLISH request, the server, supporting versioning, generates and assigns a data identifier "x", which will be used to identify data content D1, and stores, or caches this data and the associated data identifier "x" in a cache in a next step 2:3. According to one embodiment, the data identifier may be an already existing Etag, which, in addition to its conventional use, may be used also for the described versioning purpose. The SIP PUBLISH request can now be processed by the server 201 according to conventional procedures.

Next, the server 201 indicates a successful reception of the SIP PUBLISH request to the client 200, including an indication that versioning is supported has been executed by generating a response message, e.g. a 200 OK. The response message comprises data identifier "x" and e.g. "versioning done", and is transmitted to the client in a subsequent step 2:4. Once the client has received the 200 OK response message, data identifier "x" is cached together with data content D1, as indicated with a next step 2:5.

At a later occasion, a new SIP PUBLISH request, comprising of presence information, here denoted data content D2, is provided to the client 200 by the presentity. The publication is processed by the client and interrogated by checking the cache, and also this time it is determined that data content D2 has not already been published to the server by checking the cache of the client 200. This procedure is executed at a step 2:6, prior to transmitting the request to the server 201 at a next step 2:7.

In a subsequent step 2:8, the server interrogates the SIP PUBLISH request and verifies that versioning is required and, thus, another data identifier "y", associated with data content D2 is retrieved by the server. The data identifier "y" is then cached at the server 201, together with the associated data content D2, and the SIP PUBLISH request can be processed by the server 201 in a conventional manner. The successfully completed reception of the SIP PUBLISH request, including a successful execution of the required versioning procedure, executed for data content D2, is then verified to the client in a 200 OK response message, as indicated with a step 2:9. In resemblance to step 2:5, data identifier "y" and data content D2 are then cached by the client 200 in a next step 2:10.

Once again the client 200 receives presence information from the presentity. This time, however, the inserted presence information is found to be identical to already transmitted data content, i.e. data content D1. Since a checking procedure at the cache reveals that data content D1 is already present in the clients cache, a modified SIP PUBLISH request, only comprising the data identifier associated with D1, i.e. data identifier "x", which is retrieved from the cache, but no data content, will be transmitted to the server. This procedure is executed at a step 2:11, and a SIP PUBLISH request, with a reduced size, compared to an ordinary SIP PUBLISH request will be transmitted to the server in a next step 2:12.

At a subsequent step 2:13, the server recognises that the SIP PUBLISH request only comprises data identifier "x", and, thus, the cache will be interrogated for determining whether there is data content stored which can be linked to via data identifier "x". When found in the cache, data content D1 is added to the SIP PUBLISH request before it is processed by the server 201 in a conventional manner. The server verifies a successful versioning to the client 200 by transmitting a 200 OK response message to the client, as illustrated with a step 2:14. If, however, the expected data content could not be found in the cache, the server 200 will instead respond by requesting for a retransmission. Such a retransmission will be a complete SIP PUBLISH request, comprising both the data identifier and the relevant data content, which upon reception can be cached accordingly, before the data content is inserted into the publication, which is forwarded to a processor for conventional publication processing.

As mentioned above, once presence information has been delivered to the server 201, and if applicable, a successful versioning has been executed, the retrieved data content can be further processed by the server 201, i.e. the data content can be delivered to one or more watchers as a notification, all according to conventional, well known presence service procedures.

By indicating in the requests sent to the server 201 when versioning is required, the suggested versioning mechanism may be enabled or disabled, respectively, upon request, thereby allowing the respective information exchange service to disable versioning and to run the service in a conventional manner, only using versioning when required, or on a more permanent basis. Alternatively, versioning may be enabled, e.g. between a presence server and a watcher, while being disabled between the presentity and the presence server, or vice versa.

According to another embodiment, an alternative versioning mechanism may be introduced, wherein a data identifier is generated already at the client, instead of at the server. An exemplary scenario, illustrating such a mechanism will now be described with reference to FIG. 3.

Initially, a SIP PUBLISH request comprising a request for versioning and presence data, delivered as data content D1, initiated by the presentity, is processed and checked against a cache of a client 300 in a first step 3:1, in order to determined if data content D1 has been previously transmitted to a server 301. Since this is the first time data content D1 is transmitted to server 301, no corresponding data content will be found in the cache. As a result, the SIP PUBLISH request is provided with a data identifier "x", generated at, and inserted by the client 300. The SIP PUBLISH request is then transmitted to the server 301 in a subsequent step 3:2.

At the server 301, it is determined that versioning is required, and the data content D1 and data identifier "x" are therefore cached subsequent to receiving the SIP PUBLISH. This is illustrated with a step 3:3. A successful reception and versioning is verified to the client with a 200 OK response message, as illustrated with a step 3:4. In response to the 200 OK response message, also the client caches data content D1 together with data identifier "x" in a cache of the client 300, in a next step 3:5.

In steps 3:6-3:10, a corresponding procedure is repeated for another setting of presence data, delivered as data content D2, and in a corresponding way another data identifier "y", associated with data content D2 is derived and inserted into the SIP PUBLISH request, together with D2.

In another step 3:11, the client 300 receives and processes a new SIP PUBLISH request, comprising new presence data for publishing. Since a checking at the cache reveals that the new presence data, represented as data content D1, is identical to an already transmitted, and cached version of presence data, i.e. the data content transmitted in step 3:2, the SIP PUBLISH request is modified, stripping the request from its data content and inserting data identifier "x" into the request, wherein data identifier "x" will be used as an identifier of data content D1 at the receiving end, i.e. at the server 301. A SIP PUBLISH request of limited size will now be transmitted to the server in a next step 3:12.

At the server 301 it is checked whether the data content, identified by data identifier "x", has been cached previously or not. This is done in a subsequent step 3:13. Successful reception, and versioning of the SIP PUBLISH request is then indicated to the client 200 with a 200 OK response message, in a final step 3:14.

In resemblance to the previous embodiment, failure to find the relevant presence data in the cache will result in a request for a retransmitted publishing request, wherein both presence data and the associated data identifier will be transmitted in a SIP PUBLISH request. The presence data can now be retrieved from the cache and added to the SIP PUBLISH request, which will then be available for processing, according to well known publishing processing procedures.

Today Presence Servers may be equipped with some sort of caching algorithm, such as, e.g. a Least Recently Used (LRU) algorithm, assuring that the number of versions of data content stored in the cache does not excess a preset limit. An LRU algorithm keeps track of, and removes the least recently used version, whenever the limit for the maximum number of versions that the server can handle is about to be reached.

In addition to the embodiments described above, covering pushing of information from a client to a server, the described versioning mechanism, or any corresponding mechanism, may be applicable also for polling of information.

Typically for a presence service, a watcher, subscribing for presence information associated with a certain presentity, or a group of presentities, will be notified of a new relevant published data identifier as soon as it is available at the presence server. Such a notification is typically forwarded to the Watcher as a SIP NOTIFY request. By introducing versioning also when handling notifications forwarded from a presence server towards a watcher, even more capacity can be gained than what is the case when handling publications, delivered to the presence server from a presentity.

A scenario, exemplifying how a client, operating as a watcher, may interact with a server, operating as a presentity server, for handling updated presence information, using the described versioning mechanism, according to one embodiment, will now be described with reference to FIG. 4.

A client 401 wanting to subscribe to presence information of a specific presentity (not shown) can initiate such a subscription by sending a SIP SUBSCRIBE request to a server 400, as indicated with a first step 4:1. Since the client 401 supports versioning and wants to activate this feature, a request, such as e.g. "versioning required" is added to the SIP SUBSCRIBE request. The server 400, also supporting versioning, responds by returning a 200 OK response message to the client 401 in a subsequent step 4:2.

Once a subscription of presence information, including versioning, has been activated by the server 400, the server will notify the client 401 when a change has occurred in the respective presentity's presence data. In another step 4:3, the server receives and processes a SIP NOTIFY request, comprising presence data for delivery to the client. Once the server has identified new presence data, by executing conventional presence service processing, the data content, in this case delivered via a publication, will be interrogated. In this case versioning is required and, thus, this is indicated in a respective notification, e.g. as "versioning required". In addition to the data content, D1, the SIP NOTIFY request is also provided with an associated data identifier, which may be the same one as was used for the publishing case, described earlier, or it may be a new data identifier, generated by and inserted into the SIP NOTIFY request at the server. In resemblance to the embodiments describing publication deliveries, the data identifier may be provided into the notification, either at the server 400 or at the client 401. In this embodiment, the data identifier is provided to the notification at the server 400. At a step 4:4, a SIP NOTIFY request, comprising data content D1 and an associated data identifier "x", is transmitted to the client.

Upon receiving the SIP NOTIFY request, the client 401 caches the presence data D1 and the associated data identifier "x", as indicated with a subsequent step 4:5. At this stage the retrieved presence data can be processed by the client in a conventional manner.

The client 400 then verifies a successful reception, including a successful versioning, by transmitting a 200 OK response message to the server 400 in a next step 4:6. In response to the 200 OK response message, the server 400 caches data content D1 and the associated data identifier "x" in another step 4:7. At subsequent steps 4:8-4:12, a corresponding notification procedure is executed also for presence data D2, which is delivered to the client 401, together with an associated data identifier "y". At another step 4:13, a new notification is generated at the server 400 in response to the reception of a publication from the presentity. A new SIP NOTIFY request, comprising presence data, this time identified as data content D1, is again identified at the server 400. This time, however, it is determined that data content D1 has already been delivered from the server 400 to the client 401, since an identical version of the presence data is found in the cache. As a consequence, the SIP NOTIFY request to be delivered to the client 401 will only comprise data identifier "x", but no presence data, and thus, the request will be modified, stripping the request from its data content, D1, inserting instead data identifier "x" into the request. A notification of reduced size is then transmitted to the client in a subsequent step 4:14.

The client 401, receiving a SIP NOTIFY request, only comprising a version, interrogates the cache in order to determine whether the presence data associated with data identifier "x" actually has been cached at a previous stage. Since this was done at step 4:5, the respective presence data, i.e. data content D1, is retrieved from the cache and added to the notification. This is indicated with a step 4:15. The client 401 sends a 200 OK response message to the server 400 in a subsequent step 4:16, verifying a successful versioning, and the stored data content D1 can now be processed by the client 401 in a conventional way.

Alternatively, a procedure corresponding to the one described with reference to FIG. 2, wherein a data identifier is provided to the SIP NOTIFY at the client instead of at the server, may be applicable. Such a mechanism may rely e.g. on using Etags.

In an alternative embodiment, a client, receiving updated information from a server, may indicate to the server how many versions of data content it can handle. This information can be provided to the server 400 in a first response message to a request. Alternatively, each response messages sent by a server may comprise an indication as to how many remaining versions the client can handle. Any of these two alternative ways of controlling the number of versions of data content, handled simultaneously by a client and stored in the cache, may be implemented and used as a complement to, or as an alternative to an LRU algorithm.

Which actual value as such that is chosen to indicate a specific data identifier is not of relevant importance. The server may for example choose the same value when notifying different clients, wherein a data identifier could be any string that is unique for the client, such as, e.g. a hash value of the included data, or simply a data identifier that is kept by the server and the client.

The suggested versioning mechanism requires that the entities involved in the communication of the requests keep track of which data content, e.g. presence data, that has been transmitted to which entity.

As described above, this may be achieved by caching the data content and an associated data identifier both at the transmitting, and the receiving entity.

Figure 5:
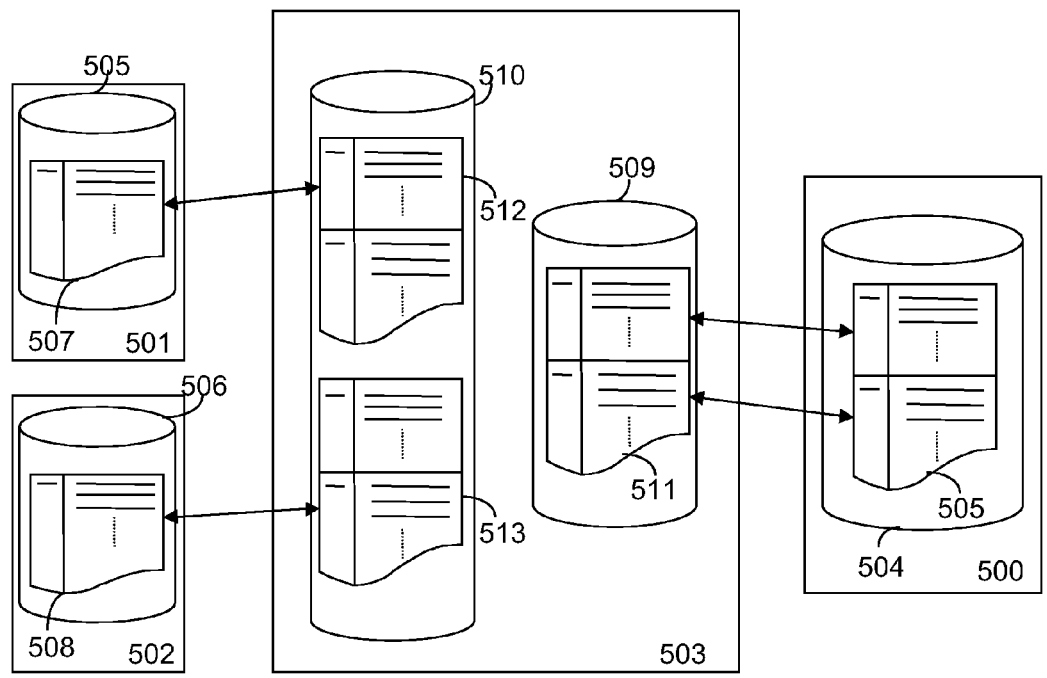
FIG. 5 is a schematic illustration of a caching of presence data, according to one embodiment.

FIG. 5 schematically illustrates how such a caching mechanism may be organised, according to one embodiment. The figure illustrates how caching may be arranged for one presentity 500 and two watchers 501,502, all of which are adapted to enable versioning according to any of the embodiments, described above. The clients 500-502 may access different information exchange services from a presence server 503, also adapted to enable versioning. It is to be understood that in the figure additional functionality necessary for execution of relevant services at the respective entities have been omitted for simplicity reasons.

The presentity 500 comprises a cache 504 for caching data content and an associated data identifier that has been successfully transmitted by the presentity 500 to the server 503. A subsection used for caching when transmitting publications to server 503 is represented by 505. At the watchers 501 and 502, subsections of caches 505 and 506 are represented by 507 and 508, respectively. A watcher receiving a notification from the server 503 caches the received presence data, together with the respective data identifier, and interrogates the cache when a notification, only comprising a data identifier is received in order to retrieve the respective data content. The server comprises one cache 509 for caching incoming requests, i.e. for caching presence data content and a data identifier associated with publications received from a client. The server also comprises one cache 510 for caching outgoing requests, i.e. for caching presence data content and a data identifier associated with notifications transmitted to a terminating client. A subsection 511 of cache 509, is used for storing information received from presentity 500, while cache 510 has corresponding subsections 512 and 513, where presence data and a data identifier associated with Watcher 501 or 502, respectively, are stored.

Figure 8:
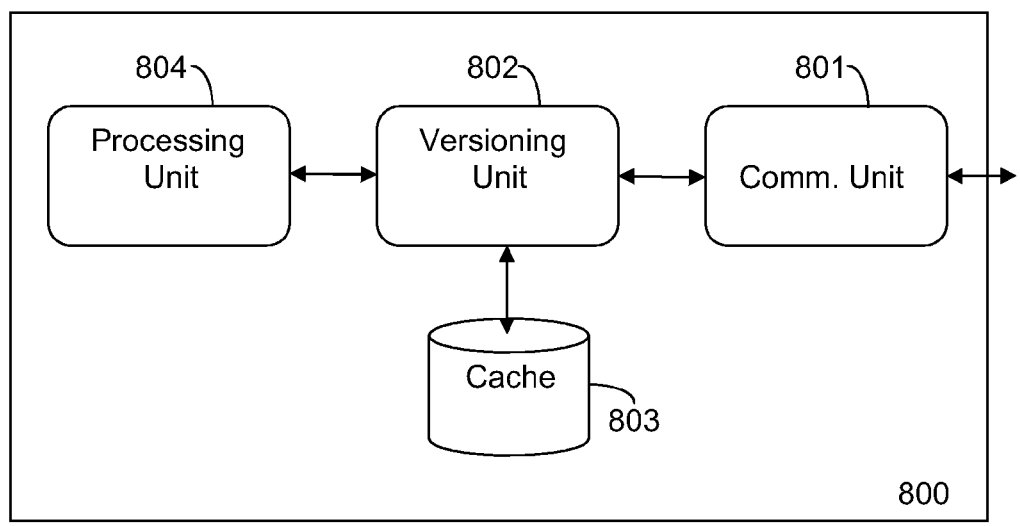
FIG. 8 is a schematic illustration of a client adapted to handle received updated data content, according to one embodiment.

Exemplary embodiments describing functionality for executing a versioning mechanism according to any of the described embodiments at a server and clients will now be described with reference to FIG. 6-8. It is to be understood that the arrangements described in the following sections are purely logical and that the described units, providing relevant functionality at the nodes, can be implemented in different, alternative ways. It is also to be understood that any functionality which is not necessary for the understanding of the mechanism behind the implementation of the proposed versioning feature have been omitted for simplicity reasons.

Figure 6:
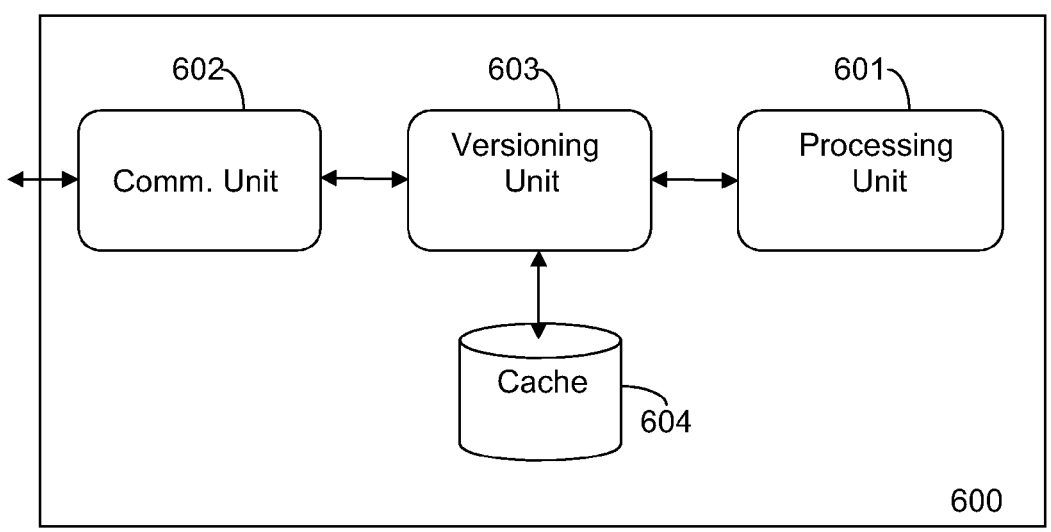
FIG. 6 is a schematic illustration of a client adapted to provide updated data content to a server, according to one embodiment.

FIG. 6 describes a client 600, e.g. a presentity, which is adapted to deliver data content, e.g. presence information, to a server (not shown), e.g. a presence server, according to one embodiment. The client 600, comprises a conventional processing unit 601, typically along with additional processing units, adapted to process requests, associated with a requested information exchange service.

Before a request, which may require versioning, is forwarded to the relevant server via a conventional communication unit 602, it is interrogated by a versioning unit 603, while a request not requiring versioning will be handled according to known procedures, i.e. forwarded directly to the communication unit 602, which then forwards the request to the respective server in a conventional manner. The versioning unit 603 is connected to a cache 604, where a complete version of data content and an associated data identifier are stored the first time the data content is transmitted to the server. According to one embodiment, the versioning unit is also adapted to provide a data identifier, which will be associated with a respective data content. According to another embodiment, where a data identifier is instead provided by the server, the versioning unit is adapted to cache the data content in response to receiving a response message, i.e. a 200 OK response, verifying a successful reception of a request, including the successful execution of a versioning procedure.

In order to enable versioning at a server, also the server has to be adapted accordingly. A server, such as e.g. a presence server, adapted to provide versioning according to any of the embodiments described above will therefore now be presented with reference to FIG. 7.

Figure 7:
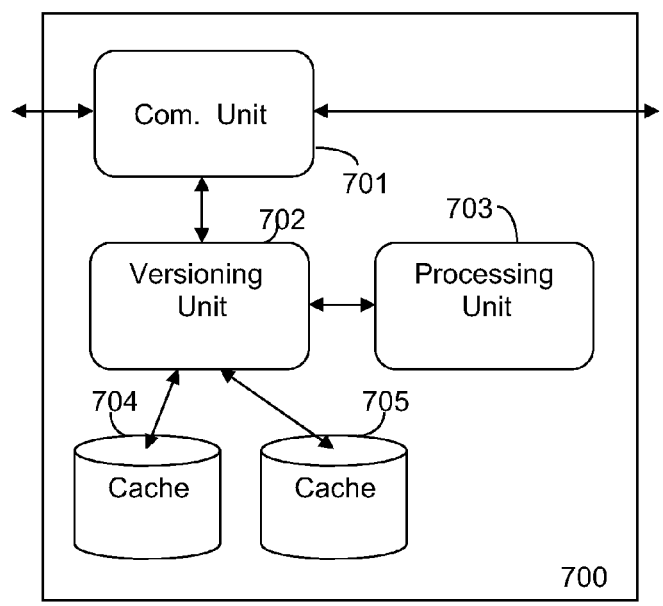
FIG. 7 is a schematic illustration of a server adapted to manage updated data content, according to one embodiment.

The Server 700 of FIG. 7 comprises at least one conventional communication unit 701 for communicating with clients (not shown), such as, e.g. presentities, providing service related data content via requests forwarded as messages, e.g. publications, to the server. The server is also adapted to communicate with watchers, which may expect another type of messages, e.g. notifications, to be delivered from the server, according to predefined rules and constraints. The communication unit 701 is adapted to forward a message, e.g. a publication, received from a client, to a versioning unit 702. If no versioning is requested in the massage, the message is forwarded directly to a conventional processing unit 703, where it can be processed in a conventional manner. In response to receiving a publication, one or more notifications may e.g. be generated, all according to relevant subscriptions, managed by the server 700. In case versioning is supported by the server 700, a received message comprising a request for versioning, but no data identifier, will be provided with a data identifier, which is added to the message and forwarded to the initiating client.

In case a data identifier is instead provided at the client, a message, comprising a request for versioning and the data identifier together with the associated data content will instead be identified by the versioning unit 802. The data content and the data identifier are then cached at a first cache 704, dedicated for the receiving side of the server, prior to processing the message at the processing unit 703, and delivering an associated message, e.g. notification, to the communication unit 701. In case versioning is required and a data identifier is present, but no associated data, i.e. this data content has been delivered to the server before, the versioning unit 702, is instead adapted to interrogate the first cache 704 to determine, whether the data content associated with the data identifier is actually stored in the first cache 704.

A message to be delivered to a client from the server, e.g. as a notification, is provided to the versioning unit 702 from the processing unit 703. The message, comprising a request for versioning, a data identifier, and associated data content will be checked by the versioning unit 702, which is interrogating a second cache 705, dedicated for the transmitting end of the server 700. If data content linked to by the respective data identifier is found in the second cache 705, this means that the present data content has been transmitted to the respective client before. The versioning unit then modifies the message by removing the data content, in order to limit the size of the message. If, however, no corresponding data content can be found in the second cache 705, it is determined that this is the first time the data content is to be transmitted to the client and, thus, the message will remain unchanged, carrying both data content and a version when transmitted to a terminating client.

The data content and the corresponding data identifier are then forwarded to the communication unit 701, from where the notification is transmitted to a respective client, and in response to receiving a 200 OK response message from the client, indicating a successful reception and versioning of the message, the data content and the associated data identifier are cached at cache 705.

If it is found by the versioning unit that versioning of the publication is required, but no versioning has been executed in a prior step, e.g. during publishing, or if separate versioning procedures is to be executed at the different server ends, the versioning unit is adapted to provide the message with a data identifier before delivering the message to the client. If a terminating client responds with a negative response to such a message, which was carrying a data identifier but no data content, the versioning unit 702 is adapted to generate a new message, comprising both the new data identifier and the relevant data content, retrieved from the cache 705. The versioning unit 702 then forwards the new message to the communication unit 702 for transmission to the client.

A client, such as e.g. a Watcher, adapted to enable versioning for received messages, e.g. notifications from a Server has already been mentioned above. Such a modified client will now be described with reference to FIG. 8. A message delivered by a server (not shown), such as e.g. the one described above, is received by a communication unit 801, of a client 800 and interrogated by a versioning unit 802. Upon receiving a message, comprising a request for versioning, but no data identifier, the versioning unit 802 is adapted to provide a data identifier, such as e.g. an Etag, which is then cached at a cache 803, together with the associated data content. The versioning unit 802 is also adapted to provide a response message comprising the data identifier to the server.

If, however, the message comprises a data identifier, but no data content, the versioning unit 803 is adapted to instead check the cache 803 for data content stored together with the respective data identifier, and to provide the message with the respective identified data content, before the message is forwarded to the processing unit 804 for conventional processing of the message. A message comprising a data identifier and associated data content is handled accordingly by the versioning unit 802, and the data identifier and the associated data content are stored at the cache 803 in response to a successful reception and versioning of the message. Upon having cached the delivered content, the message is forwarded to the processing unit 804 for processing of the data content.

Nodes involved in data processing according to any of the embodiments described above may be configured to use any of the described versioning mechanisms, or a corresponding solution, as an alternative to standard functionality, i.e. when required according to circumstances, or parallel to standard transmission functionality.

While the invention has been described with reference to specific exemplary embodiments, the description is generally only intended to illustrate the inventive concept and should not be taken as limiting the scope of the invention, which is defined by the appended claims.

The invention claimed is:

1. A method in a communication network of delivering messages associated with an information exchange service between a first entity and a second entity, said method comprising the following steps, executed by the first entity:
    processing a message associated with an information exchange service, said message comprising data content and a request for versioning, wherein versioning comprises associating each version of data content of a message with a data identifier, identifying said version,
    determining if the data content has already been delivered to the second entity, and
    transmitting said message unchanged to the second entity in case said data content has not already been delivered to the second entity, or
    transmitting a modified message to the second entity in case the data content has already been delivered to the second entity, said modified message comprising a data identifier but no data content.

2. A method according to claim 1, wherein said first entity is a server and said second entity is a client.

3. A method according to claim 2, wherein said message a SIP notification.

4. A method according to claim 3, further comprising the following step, to be executed prior to said processing step:
    receiving a request for an information exchange service from the second entity, said request indicating that versioning is required.

5. A method according to claim 1, wherein said first entity is a client and said second entity is a server.

6. A method according to claim 5, wherein said message is a SIP publication.

7. A method according to claim 1, wherein said determining step comprises interrogating a cache.

8. A method according to claim 1, wherein said data identifier is inserted into said message at the first entity.

9. A method according to claim 1, wherein said data identifier is provided from the second entity.

10. A method according to claim 9, wherein said data identifier is provided to the first entity in a response message, said response message indicating successful delivery of said message.

11. A method according to claim 1, wherein said data content and said associated data identifier are stored in a cache of said first entity subsequent to receiving a response message, verifying that said message has been successfully delivered to and stored at a cache of said second entity.

12. A method according to claim 11, wherein a first response message comprises an indication of the total capacity of the cache of said second entity.

13. A method according to claim 11, wherein each response message comprises an indication of the remaining capacity of the cache of said second entity.

14. A method according to claim 1, wherein said data identifier is a version number or a unique identity.

15. A method according to claim wherein said data identifier is an Etag.

16. A method in a communication network of handling messages associated with an information exchange service at a first entity, wherein said messages are delivered from a second entity to said first entity, said method comprising the following steps:
    receiving a message associated with the requested information exchange service, said message comprising a request for versioning; wherein versioning comprises associating each version of data content of a message with a data identifier, identifying said version,
    determining if said message comprises data content,
    retrieving a data identifier associated with the data content and storing said data content together with said data identifier, in case said message comprises data content, or
    providing the message with stored data content, associated with a data identifier, said data identifier being retrieved from the message, in case said message does not comprise any data content, and
    processing the message.

17. A method according to claim 16, wherein said first entity is a client and said second entity is a server.

18. A method according to claim 17, wherein said message is a SIP notification.

19. A method according to claim 18, further comprising the following step, to be executed prior to said receiving step:
    forwarding a request for an information exchange service to the second entity, said request indicating that versioning is required.

20. A method according to claim 16, wherein said first entity is a server and said second entity is a client.

21. A method according to claim 20, wherein said message is a SIP publication.

22. A method according to claim 16, wherein said retrieving step comprises retrieving said data identifier from the first entity.

23. A method according to claim 22, wherein said data identifier is forwarded from the first entity to the second entity in a response message, said response message indicating a successful delivery of said message.

24. A method according to claim 16, wherein said retrieving step comprises retrieving the data identifier from the message, said data identifier being inserted into said message at the second entity.

25. A first entity of delivering messages associated with an information exchange service to a second entity, said first entity comprising:
- a processing unit for processing a message associated with the requested information exchange service, said message comprising data content and a request for versioning, wherein versioning comprises associating each version of data content of a message with a data identifier, identifying said version,
- a versioning unit for determining if the data content has already been delivered to the client, and
- a communication unit for transmitting the message unchanged to the client in case said data content has not already been delivered to said client, or for transmitting a modified message to the client in case said data content has already been delivered to said client, said modified message comprising a data identifier but no data content.

26. A first entity according to claim 25, wherein said first entity is a server and said second entity is a client.

27. A first entity according to claim 26, wherein said communication unit further comprises:
- a receiver for receiving a request for an information exchange service from the second entity, said request indicating that versioning is required.

28. A first entity according to claim 26, wherein said versioning unit is adapted to interrogate a cache in order to determine if said data content has already been delivered to said first entity.

29. A first entity according to claim 25, wherein said first entity is a client and said second entity is a server.

30. A first entity of handling messages associated with an information exchange service, wherein said messages are received from a second entity, said method comprising the following steps:
- a communication unit for receiving a message from the second entity, said message comprising a request for versioning, wherein versioning comprises associating each version of data content of a message with a data identifier, identifying said version,
- a versioning unit for determining if said message comprises data content, said versioning unit being adapted to retrieve a data identifier associated with the data content and to cache said data content together with said data identifier, in case said message comprises data content, or to provide the message with stored data content associated with a data identifier, after having retrieved said data identifier from the message, in case said message does not comprise any data content, and
- a processing unit for processing the message.

31. A first entity according to claim 30, wherein said versioning unit is connected to a cache, said versioning unit being adapted to cache data content and an associated data identifier in response to a successfully delivered or received message.

32. A first entity according to claim 30, wherein said first entity is a server and said second entity is a client.

33. A first entity according to claim 30, wherein said first entity is a client and said second entity is a server.

* * * * *